Figure 1:
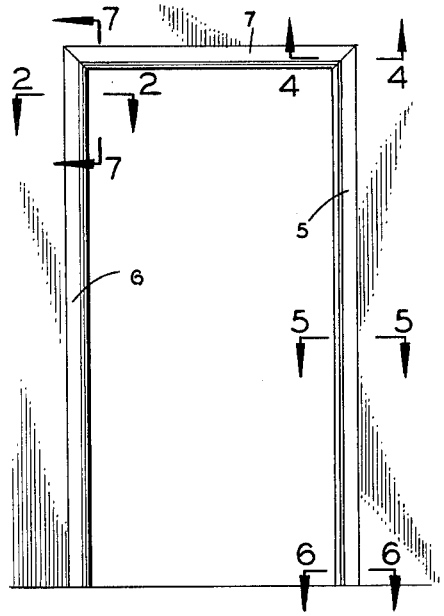

Dec. 21, 1965  R. L. EVANS  3,224,152

DOOR FRAME

Filed Sept. 11, 1963  3 Sheets-Sheet 1

INVENTOR.
RUPERT L. EVANS
BY
AT TORNEY

Dec. 21, 1965 R. L. EVANS 3,224,152
DOOR FRAME
Filed Sept. 11, 1963 3 Sheets-Sheet 2
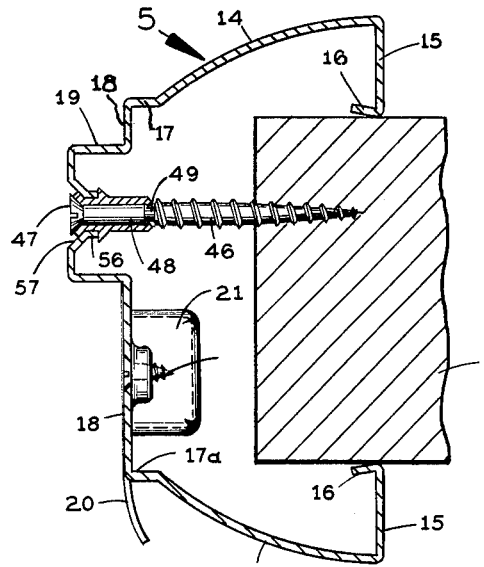
FIG. 5
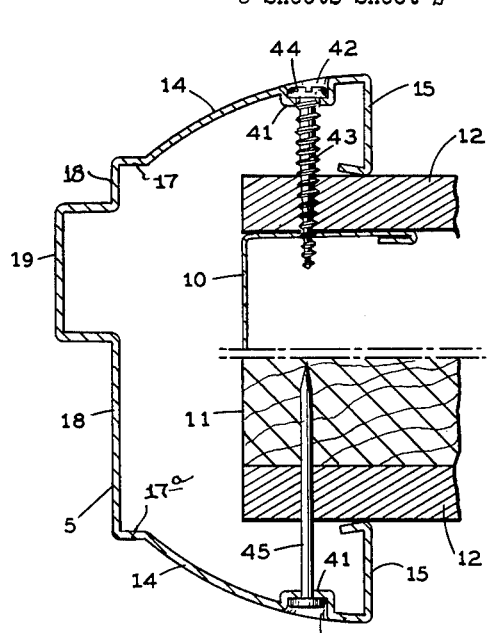
FIG. 6
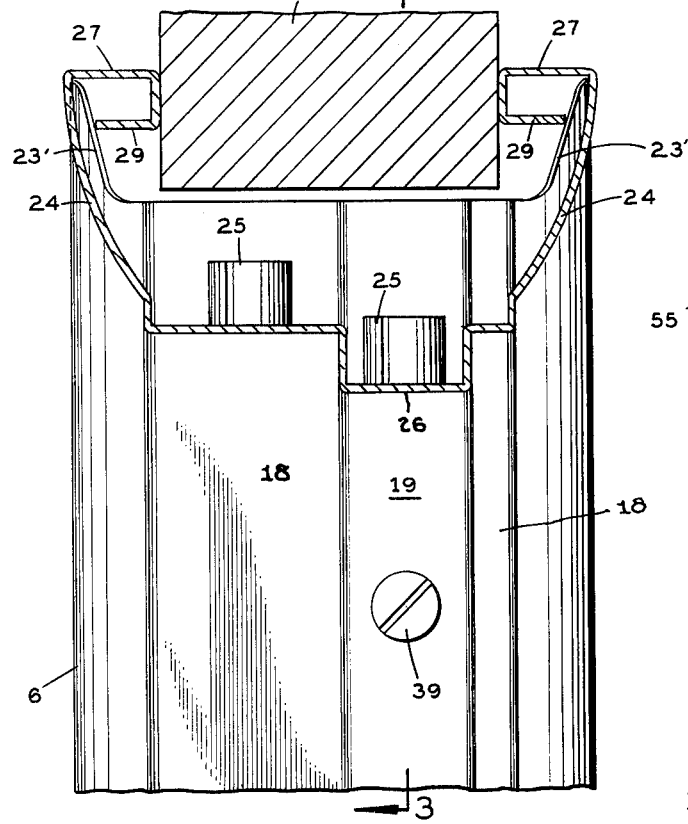
FIG. 7
FIG. 8
INVENTOR.
RUPERT L. EVANS
BY
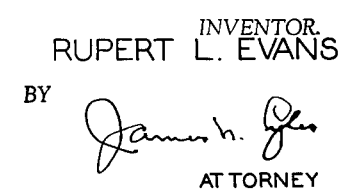
ATTORNEY Dec. 21, 1965  R. L. EVANS  3,224,152
DOOR FRAME
Filed Sept. 11, 1963  3 Sheets-Sheet 3

INVENTOR.
RUPERT L. EVANS
BY
ATTORNEY

# United States Patent Office 3,224,152
Patented Dec. 21, 1965

3,224,152
DOOR FRAME
Rupert L. Evans, 5100 Tyler St., Hollywood, Fla.
Filed Sept. 11, 1963, Ser. No. 308,214
2 Claims. (Cl. 52—217)

This invention relates to door frames, window frames and the like and has particular reference to door frames or window frames that have been designed to be installed over a finished wall that constitutes the edge of a wall opening and with the frame embodying adjustable joinery of frame horizontal members and vertical members and, pertains to frames which, heretofore have incorporated mitered corners or coped corners, regardless of type of joinery of frame horizontal members and vertical members, and pertains to frames which compound the use of adjustable joinery and mitered corners.

The novel invention hereinafter described has particular reference to frames which compound the use of adjustable joinery and mitered corners as means of locking together the horizontal and vertical frame members at the corner junctures, and this invention improves the result of corner joinery by now and first making it practical to use coped corners in conjunction with adjustable joinery means and offers, now and first, the means of developing a true corner alignment of frame horizontal and vertical members at corner junctures when used for installation over finished walls; the new and novel means being completely independent of the finished wall surface, as will be fully explained hereinafter.

Heretofore, when installing a frame over a finished wall, it has been necessary to depend on the condition of degree of wall surface straightness and alignment of the casing portion of the frame horizontal and vertical members when they join to form corners. Evidence of this intent is shown in applicant's Patent No. 2,835,933. Experience however, teaches that numerous conditions actually exist under normal and typical building construction practices which perpetuate the inability of the frame installer to obtain the flush alignment of the frame casing portions at the corners, and some of the responsible conditions that make it difficult to secure proper alignment of the frame casing portions are:

(a) Natural warpage of wood wall-stud materials.
(b) Mal-alignment of sub-wall vertical and horizontal members, which results in the horizontal member jutting in on the opposite side of the wall, thus creating a serious interruption of the intended wall-thickness dimension at the immediate location of the intended mitered corner(s).
(c) Manufacturers' tolerances in forming of the frame members.

The presence of either condition (a) or (b) voids the possibility of gaining an intended mitered corner because of either the vertical or horizontal frame members being forced away from the normal wall surface, due to the abrupt interruption of wall thickness dimension right at the position on the wall where the frame joinery becomes critical. Such condition or conditions result in necessitating filling the out-of-alignment corners with mastic material to inobviate the mal-alignment, and which then creates a condition which eliminates the future possibility of re-adjustment of the frame after the building has settled; such re-adjustment resulting in loosening and breaking away of the mastic filler; or the installer permits the frame horizontal member to overlap the outer surface of the casing portion of the frame vertical member and forces the horizontal member downward over the outer surface of the frame vertical member to evolve with a "coped" corner, in lieu of the "mitered" corner for which the frame was intended. This creates a false joinery which offers overlapping of flat surfaces, as well as revising the dimension of the intended frame opening dimension, vertically, and causes an out-of-alignment condition where the door top edge would otherwise lie parallel with the frame horizontal member.

The aforementioned conditions are eliminated by this invention through the fact that the frame vertical members are rigidly enveloped and imprisoned by the frame horizontal member which results in permanent alignment of the corner junctures of the members.

Figure 2:
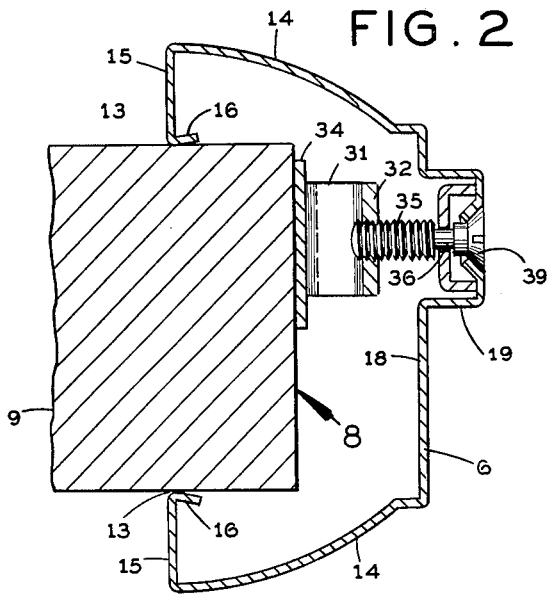
Figure 3:
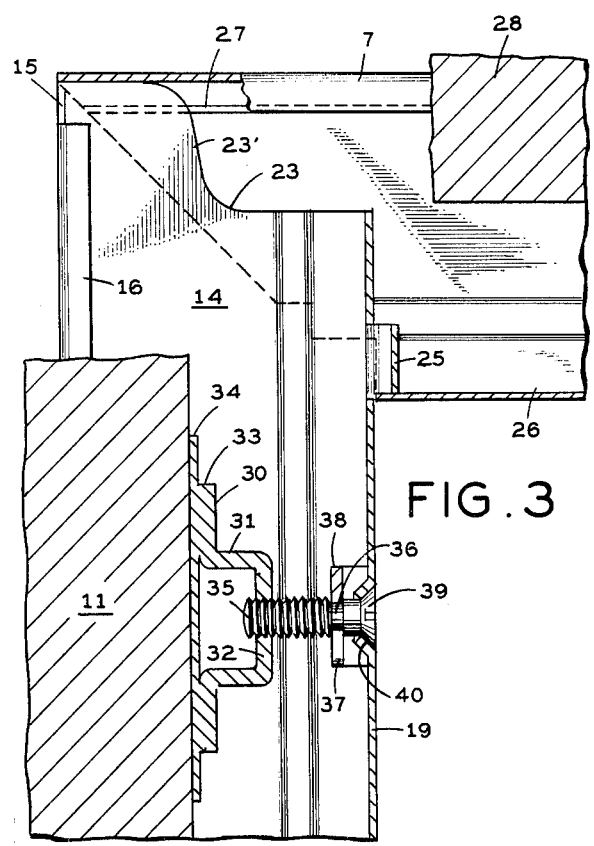
Figure 4:
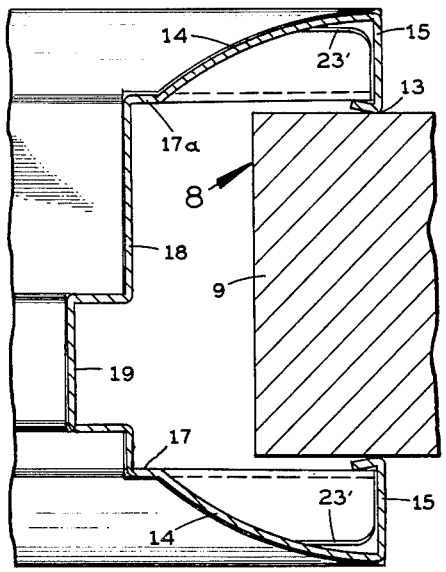
Figure 9:
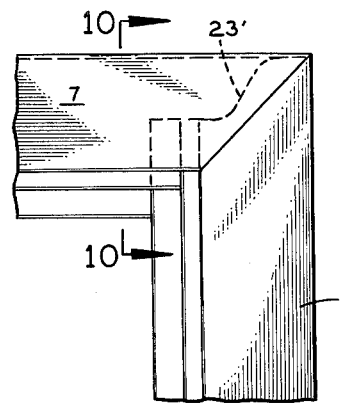
Figure 10:
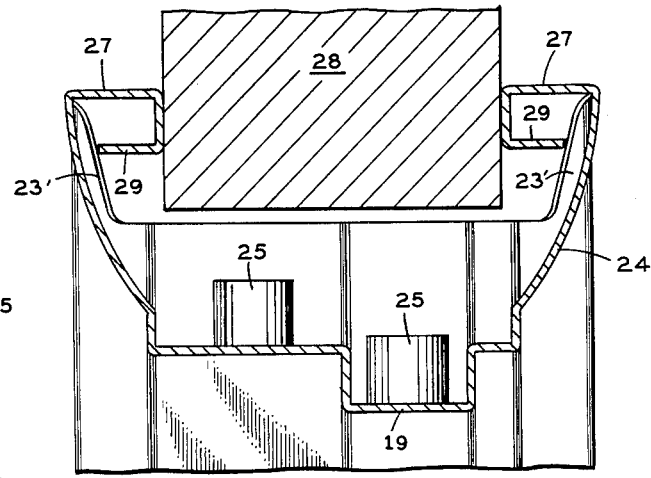
Figure 11:
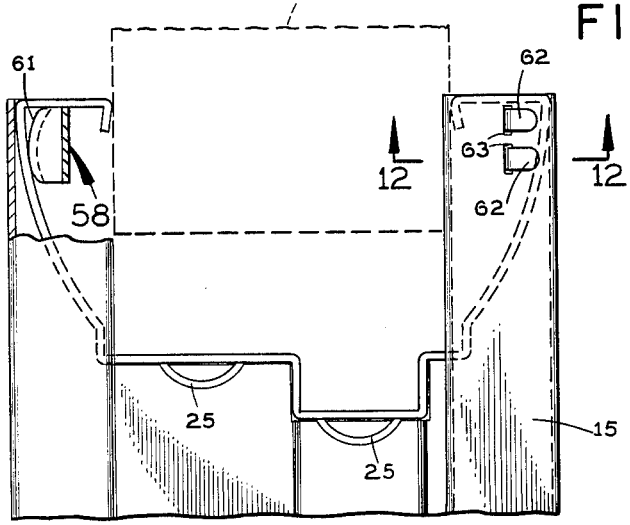
Figure 12:
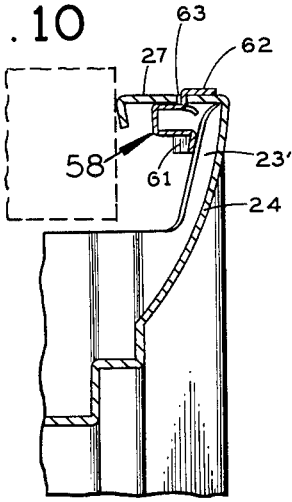
Figure 13:
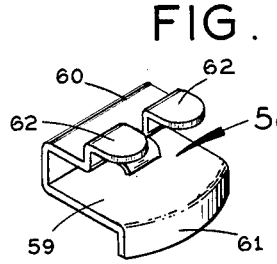
Figure 14:
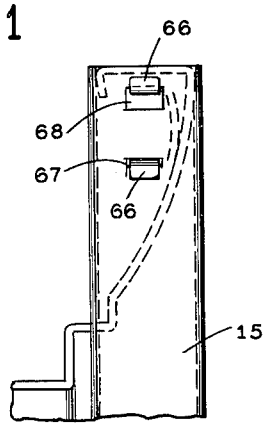
Figure 15:
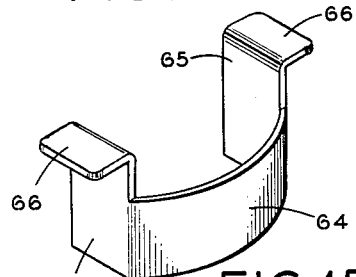

In the accompanying drawings wherein has been illustrated a preferred form of the invention and wherein like characters of reference are employed to denote like parts throughout the several figures:

FIGURE 1 is a side elevation of a door frame construction primarily illustrating the several points upon which section lines are indicated, FIGURE 2 is a transverse section taken substantially on line 2—2 of FIGURE 1, FIGURE 3 is a fragmentary vertical section taken substantially on line 3—3 of FIGURE 7, FIGURE 4 is a fragmentary horizontal section taken substantially on line 4—4 of FIGURE 1, FIGURE 5 is a horizontal section taken substantially on line 5—5 of FIGURE 1, FIGURE 6 is a fragmentary horizontal section taken substantially on line 6—6 of FIGURE 1, FIGURE 7 is a vertical fragmentary section taken substantially on line 7—7 of FIGURE 1, FIGURE 8 is a tubular stud for the anchoring of a screw threaded fastening for adjustably anchoring the jamb members to the adjacent wall studs, FIGURE 9 is a side elevation of a corner connection between a jamb member and a header, FIGURE 10 is a transverse section taken substantially on line 10—10 of FIGURE 9, FIGURE 11 is an inner face view of the upper end portion of the jamb members and the coped headers and illustrating spacer means for maintaining proper alignment of the headers with the jambs, FIGURE 12 is a fragmentary section taken substantially on line 12—12 of FIGURE 11, FIGURE 13 is a perspective view of a clip having a spacer for engaging the inner side wall of the header for maintaining alignment of the parts, FIGURE 14 is a fragmentary inner rear view of one side of the connected header and jamb, illustrating a modified form of spacer for maintaining alignment of the parts, and FIGURE 15 is a perspective view of the alignment means illustrated in FIGURE 14.

Basically, the invention comprises a pair of jamb members 5 and 6 and a connecting header 7. The jambs 5 and 6 and the header 7 are adapted to be installed within a wall opening 8, defined by a wall 9, that may be of any desirable construction. As shown in FIGURE 6, conventional steel channel studs 10 may be employed, or wood studs 11 and with the studs being faced with plaster or plaster board, or other suitable materials illustrated generally at 12. The means whereby the jambs 5 and 6 are installed within the wall opening and the means whereby the header 7 may be connected to the upper ends of the jambs, will be later specifically described. The jambs 5 and 6 are fabricated of metal having a thickness of approximately 1/32 of an inch and the jambs and the header are adapted to be flexed outwardly to a sufficient extent as to engage over the finished wall, as clearly shown in the drawings and which frames do not support the weight of a door and, which frames are dependent on the degree of wall surface straightness for the intended alignment of the casing portions of frame verticals and horizontal members at their junctures and, which frame designs are necessarily therefor given to forming an open throat 13 to a dimension which is approximately ⅛ inch less than the normal thickness of the finished wall over which the frame members are applied, and therefore necessitates a forced manual opening of the throat dimension of the fram members to permit application over the finished wall and which consequently results in slowing the installation of the frame because of the friction which takes place between the wall finished material and the frame casing portions, due to the minimal dimension of the throat of the frame members, which causes continual pressure upon the surfaces of the finished wall and, which continual pressure, in most instances voids proper operation of the intended initial adjustable joinery of frame vertical and horizontal members and results in necessitating the forcing of the adjusted members into proper position by the use of a hammer, or other such tool, so that the adjustable implementation can merely be tightened, in lieu of being adjustably functional, as intended. Now and first, with the throat dimension made to full minimal wall thickness dimension, because the two frame members, (vertical and horizontal), are independent of the condition of the wall surface straightness, inasmuch as the vertical and horizontal frame members are now mechanically joined in perpetrated alignment without requiring the backup of wall materials to give result to casing portion alignment; and can now be installed more rapidly, because of elimination of the extensive friction which has, heretofore, existed between the frame members and the wall finish material, which now gives freedom to operation and activation, as originally intended to the adjustable joinery at frame corner junctures; and adds even further to the speed of applying wall finish materials and adds further to the aesthetics of the finished framed opening inasmuch as the throat dimension can now be minimal wall-thickness dimension, wall finish material such as wall board or dry wall need not be nailed or otherwise fastened to the wall stud members at the location of the wall openings in which the frames are to be installed; warped wall studs result in waves appearing in the finished structure surfaces; because the finish wall heretofore has been fastened to the warped or mal-aligned wall studs around the entirety of the wall opening and then the door frames have been installed thereon, this continues to result in "gapping" of the wall finished material and the frame casing portion where they are intended to lie flat and together. Now, by leaving the naturally straight and flat finished material free of fastening around the wall opening, and by permitting the frame's straight edges to engulf the free-floating wall finish material, the results are that there are never any gaps around the perimeter of the frames.

The jamb members 5 and 6 are substantially identical and are of channel form. The channel is formed by outwardly and arcuately formed side walls 14 and with the side walls 14 terminating inwardly in opposed flanges 15 and with the flanges 15 having their marginal edges bent inwardly slightly angled toward the walls 14, as indicated at 16. The walls 14 forwardly are bent to form reveal-legs 17 and 17a, with the reveal-legs 17 and/or 17a leading to rabbets 18. The rabbets 18 terminate in a channel stop rib 19. One rabbet 18 upon one jamb member 5, for instance, is apertured or recessed to receive a strike plate 20 upon the inner side of the rabbet 18, when applicable to a swinging door with latch, and is covered by a dust box 21 and with the plate 20 and the box 21 being secured to the rabbet 18 by screws 22. The flanges 15 and the angular extension of the flange 15, shown at 16 constitute guide means whereby the jambs are engaged with the marginal edge of the wall opening and with the flanges 15 defining the opening for the entire height of the jamb that has a minimal width slightly less than the thickness of the wall and whereby the jambs may be quickly and easily engaged with the wall at assembly. Rabbets 18 on the opposite jamb 6 may be provided with, or for hinges for attachment to the usual closure door.

The upper ends of the jambs are notched as indicated at 23 and the arcuate walls 14 conform to the arcuate walls 24 of the header 7, forming a cope joinery between the jambs and the header. For proper and accurate positioning of the header with respect to the jambs, the wide rabbet 18 and the stop rib 19 adjacent their upper ends have been lanced to form stop lugs 25, that project out into the path of movement of the ribs 26 and 18 of the header 7. On frame jambs for thicker walls, lances would aptly appear in both rabbets 18. The upper ends of the side walls 24 of the header 7 are bent to form box-like extensions 27, with the extensions 27 being in opposed relation for engagement with the wall header 28 of the door frame opening. The box-like members are provided with a reverse flange 29 that is in spaced apart relation at its free edge to the inner side of the wall 24 of the header and the extension 23' of the jambs 5 and 6 having a snug engagment between the arcuate wall 24 and the free edge of the flange 29 thereby causing a proper and arcuate alignment between the walls 14 and 24.

In the use of the invention so far described, one jamb is first engaged over the opposite surfaces of the wall. The header and then the second jamb follow in like engagement with the wall in their respective functional positions. To fasten the jambs and header in place, a pressure member 30 bears against the face of the stud 11. The pressure member 30 embodies a U-shape member 31, having a bight portion 32 and oppositely extending legs 33 that are connected to a flat plate 34. The bight portion 32 is apertured and threaded to receive a screw 35. The screw is provided with a reduced circumferential groove 36 that engages a slot 37 in a bracket 38. The screw at its outer end is provided with a slotted head 39 that has flush seating engagement into a stamped recess 40. The plate 34 is adapted to be forced against the outer face of the stud 11 so that the jambs can be accurately shifted and produce a predetermined spacing from each other in accordance with the header 7. The groove 36, engaging the slot 37 maintains the screw in a position of rotation without shifting from the stop 19 thus, when the screw is rotated, the pressure plate 30 is moved toward and from the stud 11. One or both jambs may contain the adjusting elements.

After the accurate adjustment of the upper portions of the jamb(s) by the screw 35, the jamb is then positioned in a plumb position with respect to the opening of the wall and its lower portion is then fixed to the studding and, two forms of fastening means have been illustrated in FIGURE 6; in one form, there has been illustrated a sheet steel studding and in this type of studding, with the finish wall material 12 being laid adjacent thereto, a suitable tool is driven through an aperture 41 formed in a recess 42 creating an initial opening in the side of the stud 10. After the opening has been formed, the tool is removed and a self-threading screw 43, having a typical head 44 is inserted through the preformed opening and threads itself into the side wall 10; or, a special self-drilling screw can be utilized. In the other form illustrated, there has been provided a wood stud 11 and in this case, a nail or the like fastening device 45 is driven through the opposite opening 41 to enter the stud 11 and with the head of the nail being recessed into the recess 42. Other wall core members, or materials, may accept either nail, screw, or other fastening items.

To prevent accidental or premeditated movement of the jamb 5 whereby a door latch may be released from the strike plate 20, there has been provided a fastening means at this point in the height of the jamb that prevents both inward and outward flexing movement of the jamb under all circumstances whether intentional or otherwise. To fix the stop 19 and the rest of the jamb at this critical point, there has been provided an elongated screw 46, having a typical head 47, a shank 48 and a circumferential groove 49, between the head and the first thread of the screw. The shank 48 is inserted through a split sleeve 50, that is split for its full length as indicated at 51, having a forward bevel 52, a flaring collar 53, a hub portion 54 and a forward or rearward flange 55, or otherwise designed. The sleeve 50 is initially forced through an opening 56 formed in a beveled recess 57 and the sleeve 50, due to its split 51 will collapse or yield together so that the sleeve can be forced through the opening 56 to the point where the flaring collar 53 engages the inner end of the recess while the flange 55 seats within the bevel of the recess. The screw 46 is then forced through the sleeve 50, causing the bevel flange 52 to expand to permit the screw to be moved all the way in and with the bevel flange 52 snapping into the groove 49 thus, the sleeve 50 and the screw 46 are held with respect to the jamb and the stop 19 against dislodgment and in use, the screw 46 is screwed into the jamb 11 a functional distance that prevents inward and/or outward movement of the jamb at this point in the door frame.

Other aligning means has been provided to create the proper cove joinery and to prevent separation of the walls 14 of the jambs and the walls 24 of the header and a modified form of this means has been shown in FIGURES 11–15. In FIGURES 11, 12 and 13, there has been provided a U-shaped bracket 58 having upper and lower walls 59 and 60 and with the wall 59 extending forwardly and shaped to a right angle downwardly, forming an arcuate pressure flange 61. The wall 60 is provided with a pair of elevated tongues 62 that are engageable in slots 63 formed in the flanges 27 of the header 7 thus, when the header and the jambs are moved to assembled relation, the extension 23' of the jambs is forced inwardly between the arcuate flange 61 and the inner wall of the arcuate wall 24 thus causing the extension and the arcuate wall to have proper mating relation to form a smooth cove joinery that will be maintained in its arcuate position of engagement at all times and will not extend or be moved outwardly. The bracket 58 of course will be engaged with the jambs prior to assembly. In FIGURES 14 and 15 there has been illustrated a further modified form of bracket for forcing the extensions 23' against the wall 24, this device embodying an arcuate flange 64, having a pair of parallel wings 65. The wings 65 are bent at a right angle at one end to form lips 66. The lips 66 are connected with the jambs by first engaging one lip 66 into a slot 67 and then flexing the flange 64 to permit the engagement of the opposite lip 66 into a relatively wider slot 68 and upon release, the flexible flange 64 will maintain the bracket in fixed relation with respect to the rear wall 15 of the jamb members.

In the use of the device, it being understood that the partition wall has been constructed and the usual door frame opening disposed therein. The jambs and the header 5, 6 and 7 are installed in position by placing the opening of the jambs and the header into embracing engagement with the opening of the wall throughout the periphery of the opening, the flanges 15 of the jambs and the flanges 27 of the header 7 being placed over the finished wall. The upper ends of the jambs and the ends of the header partaking of a cope joinery and with the header and the jambs being limited in their engaging position by the lanced lugs 25. The extensions 23 of the jambs are forced into proper alignment with the arcuate walls 24 at the cove joinery as shown in FIGURES 7, 10 and FIGURES 11, 12 and 14. The jambs are then moved to tight engagement at the joinery between the arcuate wall of the header and the brackets by the screws 35 and a pressure plate 30. The screws 35 therefore function to bind the header and the jambs together firmly and evenly. After the joinery has been attained, the lower ends of the jambs are fixed to the wall in either one of the two means illustrated in FIGURE 6. After the jambs have been fully engaged with the header and the bottom of the jambs having been anchored to the walls, either by the nails 45 or the screws 43, the operator proceeds to fix the intermediate part of the jamb having the strike plate by means of the screw 46 thus preventing a flexing of the jamb either inwardly or outwardly and to maintain the strike plate 20 and the dust box in fixed relation to the latch as it projects from the edge of a closure door.

It will be apparent from the foregoing, that very novel and important changes have been made with respect to metallic door frames. The frictional engagement of the flanges 15 of the jambs and header over the wall, leaves a very desirable finished appearance and of course a base board may be installed at the walls at their base to terminate at the flanges 15, although not made a necessity, as has prevailed heretofore with frames having extending anchor straps per Patent No. 2,835,933. The structure is such that the door frame may be installed in a relatively short time as compared with present structures in use. The door frame at assembly is pleasing in appearance, is very rigid and fixed at the critical points where burglary might be attempted.

In reference to frames designed to be installed over finished walls and/or frames having adjustable joinery of horizontal and vertical members, in conjunction with wall structure members, these three new and novel ideas offer improvement through allowing possibility of use of coped corners with adjustable joinery; truly aligned coped corners whch are free of dependence on wall-surface conditions; means of adjustably attaching frame vertical members at their centers for elimination of common distortion and they offer means of eliminating bottom anchoring straps and eliminate the need of removing base board for frame replacement, and they eliminate the necessity of application of baseboard to cover anchor straps as prevalent heretofore. They reduce the costs involved in the manufacture of such products due to elimination of anchor straps and reinforcing plates and result in greatly improved product with the savings still resultant. They offer conditions which lend to more rapid installation time and an over-all more satisfactorily functional item during and following installation. They completely eliminate the need for the expensive welding equipment which has been always required for such frames heretofore.

It is to be understood that the invention is not limited to the precise construction shown, but that changes are contemplated as readily fall within the spirit of the invention as shall be determined by the scope of the subjoined claims.

I claim:

1. A metallic door frame for fitment into a preformed opening in a finished wall structure, comprising spaced apart parallel jambs that are connected together by a header, the jambs and the header each being formed of sheet metal having an inner disposed face, said face being provided with a channel forming a stop for a door, the jambs and the header outwardly from the face being rabbeted and then shaped to provide outwardly flaring arcuate walls, the walls terminating in a pair of opposed flanges forming a throat opening, the jambs and the header adapted to embrace the finished wall structure by shifting the flanges over the wall area and with the wall extending into the jambs and the header through the throat opening, the jambs at their upper ends and the header at its outer ends being notched and beveled for fitment together at assembly and with the arcuate side walls having a mating engagement at the corners whereby to form a cope joint, means carried by the opposed flanges of the header and spaced from the arcuate walls to form an opening for a wedge extension on the jambs at their upper ends whereby the wedge engagement causes the cope joint to be in flush smooth relation, a pressure device carried within the jambs adjacent their upper ends and adapted to bear against a wall core to bias the jambs outwardly to cause the jambs and the header to have pressure engagement, stop lugs carried by the upper portion of the jambs that lie in the path of upward movement of the header, the pressure device forcing the jambs into the interlocking engagement with the header for creating the cove joint, means for anchoring one jamb at approximate vertical center to a wall core adjacent to the jamb comprising an elongated screw having a shank portion and a threaded portion, the screw being circumferentially grooved at a point between the first thread and the shank, the shank having a head remote from the threaded portion whereby the screw may be rotated, an expandable sleeve adapted to receive the shank of the screw, the sleeve having an inwardly directed bevel at one end for seating within the groove on the screw, the sleeve being so designed as to permit the sleeve to contract for fitment within an opening formed in the stop, the sleeve having self-retaining means for holding it within the jamb, the sleeve having an enlarged recessed collar at the opposite end thereof to receive the screw head whereby the sleeve may be forced through the aperture to snap outwardly to prevent subsequent removal thereof, the screw extending through the sleeve and engageable with a wall core whereby the jamb may be positively held in its spaced relation with respect to the stud against twisting or unauthorized springing of the jamb at a point of the latch for the door.

2. The structure according to claim 1 that includes fastening means for the lower ends of the jambs, the said fastening means extending through apertures formed at the base of recesses and whereby the fastening devices may penetrate into the wall structure and with heads of the fastening devices being seated within the recesses.

References Cited by the Examiner

UNITED STATES PATENTS

| 2,652,907 | 9/1953 | Miller | 189—46 |
| 2,661,084 | 12/1953 | Steffan | 189—46 |
| 2,835,933 | 5/1958 | Evans | 189—46 |
| 3,007,559 | 11/1961 | Goldberg | 189—46 |

HARRISON R. MOSELEY, *Primary Examiner.*

REINALDO P. MACHADO, *Examiner.*

K. DOWNEY, *Assistant Examiner.*